(12) United States Patent  
Picard et al.

(10) Patent No.: US 9,952,854 B2
(45) Date of Patent: Apr. 24, 2018

(54) METHODS TO UPDATE PORTALS

(71) Applicant: HEWLETT PACKARD ENTERPRISE DEVELOPMENT LP, Houston, TX (US)

(72) Inventors: Jean-Charles Picard, Mougins (FR); Anas El Ferachi, Sophia-Antipolis (FR)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/031,165

(22) PCT Filed: May 12, 2014

(86) PCT No.: PCT/US2014/037689
§ 371 (c)(1),
(2) Date: Apr. 21, 2016

(87) PCT Pub. No.: WO2015/065522
PCT Pub. Date: May 7, 2015

(65) Prior Publication Data
US 2016/0253164 A1 Sep. 1, 2016

(51) Int. Cl.
G06F 9/445 (2006.01)
G06F 17/30 (2006.01)

(52) U.S. Cl.
CPC .......... *G06F 8/65* (2013.01); *G06F 17/3089* (2013.01); *G06F 17/30873* (2013.01)

(58) Field of Classification Search
CPC .......... G06F 8/65–8/67; G06F 17/3089; G06F 17/30873
See application file for complete search history.

(56) References Cited

U.S. PATENT DOCUMENTS 7,277,924 B1    10/2007  Wichmann et al.
7,451,194 B2 *  11/2008  Bowser ............ G06F 17/30899
                                                   707/E17.119
(Continued)

OTHER PUBLICATIONS

Richard Sezov, Jr, Inter-porlet communication using Portlet 2.0, published 2010, p. 1-12.*

(Continued)

*Primary Examiner* — Tuan Q. Dam
*Assistant Examiner* — Zheng Wei
(74) *Attorney, Agent, or Firm* — Hewlett Packard Enterprise Patent Department

(57) ABSTRACT

The present disclosure discloses methods to update portals (100) comprising a first portlet (105) and plural second portlets (110). The method comprises the reception by the first portlet (105) of a first update instruction (160) and the transmission by the first portlet (105) of a second update instruction (165) to each of the plural second portlets (110), the sent second update instruction (165) being the same for each second portlet (110). Then, the method comprises the reception by each of the plural second portlets (110) of the second update instruction (165), and, for each second portlet (110), the processing of the second update instruction (165) according to a predetermined update configuration (135.3, 135.4, 135.5) of the respective second portlet (110), to accept or reject an update of this second portlet (110), according to the second update instruction (165), depending on the predetermined update configuration (135.3, 135.4, 135.5).

19 Claims, 3 Drawing Sheets

(56) References Cited

U.S. PATENT DOCUMENTS

| | | | |
|---|---|---|---|
| 7,493,564 B2* | 2/2009 | Swanson | G06F 17/30873 715/738 |
| 7,500,181 B2* | 3/2009 | Kim | G06F 17/30899 707/999.01 |
| 7,533,142 B2 | 5/2009 | Ng et al. | |
| 7,636,881 B2* | 12/2009 | Lection | G06F 17/30873 715/205 |
| 7,698,655 B2* | 4/2010 | Bales | G06F 17/3089 715/708 |
| 7,739,310 B1* | 6/2010 | Shmulevich | G06F 17/3089 707/802 |
| 7,788,340 B2 | 8/2010 | Jolley et al. | |
| 8,020,103 B2 | 9/2011 | Fried et al. | |
| 8,214,731 B2* | 7/2012 | Lection | G06F 17/3089 715/200 |
| 8,468,217 B2* | 6/2013 | Appleyard | G06F 17/3089 707/707 |
| 8,539,345 B2* | 9/2013 | Appleyard | G06F 17/30873 715/234 |
| 8,572,602 B1* | 10/2013 | Colton | G06F 17/3089 709/220 |
| 8,874,654 B2* | 10/2014 | Gale | H04L 67/02 709/205 |
| 2003/0167315 A1* | 9/2003 | Chowdhry | G06F 17/30873 709/218 |
| 2004/0183831 A1* | 9/2004 | Ritchy | G06F 17/3089 715/762 |
| 2006/0047728 A1 | 3/2006 | Kim et al. | |
| 2006/0212798 A1* | 9/2006 | Lection | G06F 9/54 715/234 |
| 2006/0242582 A1* | 10/2006 | Swanson | G06F 17/30873 715/733 |
| 2007/0005731 A1* | 1/2007 | Lection | G06F 17/3089 709/219 |
| 2007/0006075 A1* | 1/2007 | Lection | G06F 17/3089 715/234 |
| 2007/0124701 A1* | 5/2007 | Gong | G06F 17/30873 715/854 |
| 2008/0040672 A1 | 2/2008 | Appleyard et al. | |
| 2008/0120343 A1 | 5/2008 | Altrichter et al. | |
| 2008/0127133 A1* | 5/2008 | Aghara | G06F 17/3089 717/140 |
| 2010/0036933 A1 | 2/2010 | Breau et al. | |

OTHER PUBLICATIONS

Rodriguez et al., IBM Websphere Portal V5 a guid for porlet application development, published 2004, pp. 576.*

Github, Inc., "Configuring Liferay Applications," (Web Page), copyright 2013, available at https://github.com/liferay/liferay-docs/blob/master/userGuide/en/chapters/04-configuring-liferay-applications.markdown.

IBM, "Setting Map Portlet Preferences," (Web Page), IBM Tivoli Netcool/OMBlbus, Version 7.3.1, retrieved online Sep. 24, 2013 at http://publib.boulder.ibm.com/infocenter/tivihelp/v8r1/index.jsp?topic=%2Fcom.ibm.netcool_OMNIbus.doc_7.3.1%2Fwebtop%2Fwip%2Ftask%2Fweb_cust_map_settingportletprefs.html.

International Search Report & Written Opinion received in PCT Application No. PCT/US2014/037689, dated Sep. 30. 2014, 11 pages.

International Preliminary Report on Patentability received in PCT Application No. PCT/US2014/037689, dated May 12, 2016, 8 pages.

* cited by examiner

METHODS TO UPDATE PORTALS

BACKGROUND

The present disclosure relates to methods to update portals comprising plural portlets. Portlets are user interface software components which are managed and displayed in a uniform way in a web portal page. Usually, a web portal page is divided into a plurality of areas and each portlet occupies one respective area to display information on the web portal page. Thus, each user of the web portal page can define a personalized layout of this web portal page by, for example, adding or deleting a portlet.

The Java Portlet Specification 286 standard (JSR 286) defines a way to design a portlet. A portlet designed according to this standard can be plugged into any portal supporting this standard. This standard provides portlet events that a portlet can send or receive with data such as an identifier, date, etc.

DETAILED DESCRIPTION

In some cases the information displayed by one portlet of a web portal page depends on the information displayed by another portlet of the same web portal page and so it is appropriate to update the content of the first portlet when the content of the second portlet changes.

In general, methods to update portlets according to the JSR 286 standard are based on a wiring definition. These methods use an additional component. Usually, when the user creates his personalized layout, he uses the additional component to define parent/child relationships between portlets. These parent/child relationships are stored in the additional component. Thus, in this additional component, parent/child relationships between portlets are hardcoded. Therefore these relationships are predefined statically. Then, with the help of this additional component, when a parent portlet is updated, a child portlet of this parent portlet is also updated.

It has been observed that the use of an additional component is complicated and time-consuming for the user, particularly in cases wherein the portal contains a lot of portlets. Moreover, the adding of the additional component usually makes the portal structure more complex.

Furthermore, in complicated cases, for example wherein a first portlet is the parent portlet of a second portlet, and this second portlet is the parent portlet of a third portlet, the update of the third portlet cannot usually be managed.

Certain examples according to the present disclosure provide for a parent/child relationship between portlets, and thus an update mechanism according to which when a parent portlet is updated, the child portlet of this parent portlet is also updated.

Figure 1:
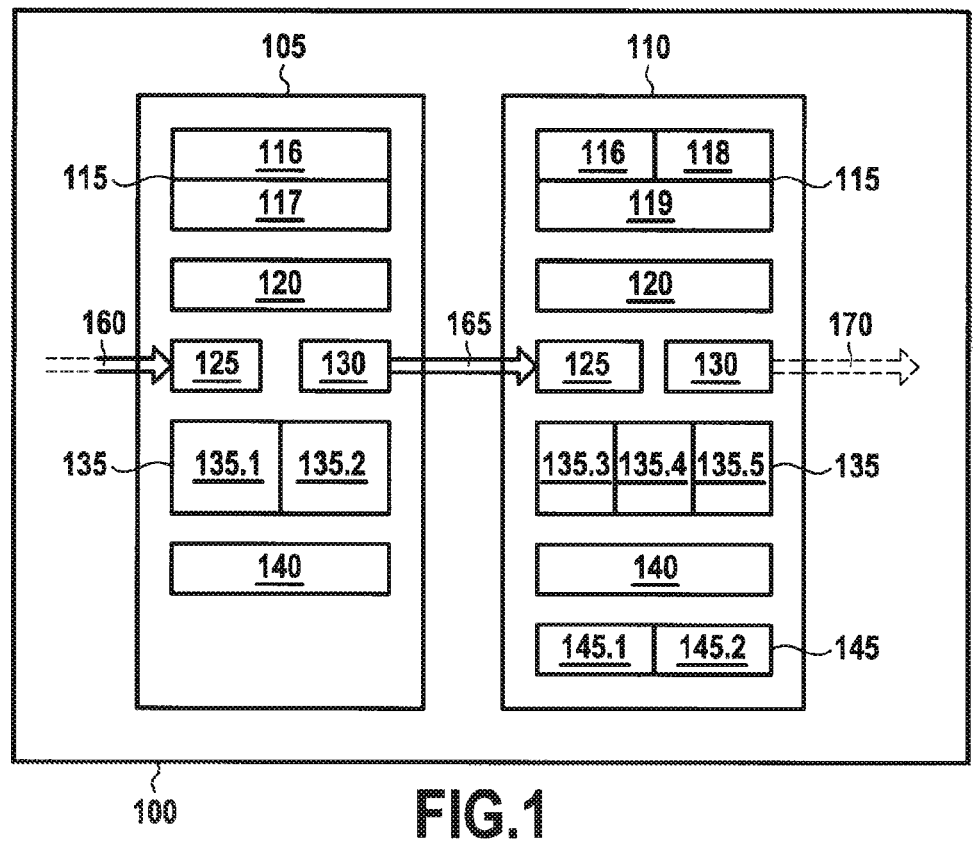
FIG. 1 represents a first portlet and a second portlet according to a particular example of the present disclosure.

FIG. 1 schematically shows a web portal page 100 comprising a parent portlet 105 (or first portlet 105) and a child portlet 110 (or second portlet 110) according to a particular example of the present disclosure.

In this example, the parent portlet 105 comprises a memory module 115, a creation module 120, a reception module 125, a transmission module 130, a processing module 135 and a displaying module 140. The memory module 115 stores an identifier 116 of the parent portlet 105 and information 117 to be displayed by the displaying module 140. In a variant, the parent portlet 105 also comprises the update instruction transferring module 145 described later.

Furthermore, in the example of FIG. 1, the child portlet 110 has been created by the creation module 120 of the parent portlet 105. Indeed, the creation module 120 allows the creation and the displaying of child portlets 110, as well as the creation of a parent/child relationship between the parent portlet 105 and child portlet 110. When a child portlet 110 is created by the creation module 120, this child portlet 110 inherits the attributes of the parent portlet 105. Thus, the child portlet 110 created by the creation module 120 of the parent portlet 105 comprises a memory module 115, a creation module 120, a reception module 125, a transmission module 130, a processing module 135, a displaying module 140. Furthermore, the child portlet 110 comprises an update instruction transferring module 145. The memory module 115 stores the identifier 116 of the parent portlet 105, an identifier 118 of the child portlet 110 and information 119 to be displayed by the displaying module 140.

The reception module 125 of the parent portlet 105 allows the parent portlet 105 to receive a first update instruction 160. The first update instruction 160 comprises update information to update information 117 to be displayed by the displaying module 140 of the parent portlet 105. The transmission module 130 of the parent portlet 105 allows the parent portlet 105 to transmit a second update instruction 165 which is received by the reception module 125 of the child portlet 110. The transmission module 130 of the child portlet 110 allows the child portlet 110 to send a third update instruction 170 in a case described later. The second update instruction 165 comprises the identifier 116 of the parent portlet 105 and update information to update information 119 to be displayed by the displaying module 140 of the child portlet 110. Furthermore, the third update instruction 170 comprises the identifier 118 of the child portlet 110 and update information to update information 119 to be displayed by the displaying module 140 of another child portlet 110. Moreover, the second update instruction 165 and the third update instruction 170 are portlet events that a portlet can send or receive.

In an example, the processing module 135 of the parent portlet 105 stores two predetermined update configurations 135.1, 135.2. The first predetermined update configuration 135.1 is such that when the parent portlet 105 receives the first update instruction 160, this parent portlet 105 is updated. The second predetermined update configuration 135.2 is such that when the parent portlet 105 receives the first update instruction 160, this parent portlet 105 is not updated. In another example, the processing module 135 of the parent portlet 105 stores the three predetermined update configuration 135.3, 135.4, 135.5 described later.

As explained in more detail later, one of the two predetermined update configurations 135.1, 135.2 of the processing module 135 of the parent portlet 105 is selected.

The processing module 135 of the child portlet 110 stores three predetermined update configurations 135.3, 135.4, 135.5. The third predetermined update configuration 135.3, named "none configuration", is such that when the child portlet 110 receives an update instruction 165 (or 170), this child portlet 110 is not updated, irrespective of the identifier 116 (or 118) comprised in the update instruction 165 (170). The fourth predetermined update configuration 135.4, named "all configuration", is such that when the child portlet 110 receives an update instruction 165 (or 170), this child portlet 110 is updated, irrespectly of the identifier 116 (or 118) comprised in the update instruction 165 (170). The fifth predetermined update configuration 135.5, named "parent only configuration", is such that when the child portlet 110 receives an update instruction 165 (or 170), this child portlet 110 is updated if the identifier 116 (or 118) comprised in the update instruction 165 (170) is the identifier of the parent portlet 105 of this child portlet 110.

As explained in more detail later, one of the three predetermined update configurations 135.3, 135.4, 135.3 of the processing module 135 of the child portlet 110 is selected.

The update instruction transferring module 145 comprises two predetermined update instruction transferring configurations 145.1, 145.2. According to the first predetermined update instruction transferring configuration 145.1, when the reception module 125 of the child portlet 110 receives the second update instruction 165, the transmission module 130 of the child portlet 110 transmits the third update instruction 170. According to the second predetermined update instruction transferring configuration 145.2, when the reception module 125 of the child portlet 110 receives the second update instruction 165, the transmission module 130 of the child portlet 110 does not transmit the third update instruction 170.

As explained in more detail later, one of the two predetermined update instruction transferring configurations 145.1, 145.2 of the update instruction transferring module 145 of the child portlet 110 is selected.

A parent/child portlet configuration may be adopted, for example, in the case wherein the information displayed by one portlet of the web portal page depends on the information displayed by another portlet of the same web portal page. In such a case, the portlet having information depending on the information displayed by another portlet is the child portlet of this another portlet.

For example, in a Service Level Agreement (SLA) portal, where the SLA is a contract between an Internet provider and a company doing business using the Internet, a parent portlet may display an identifier and the compliance of the current contract and a child portlet may display details of the current contract like objectives and current values. Thus, if the contract changes, the identifier of the current contract will be different and the details of the current contract will also be different.

Figure 2:
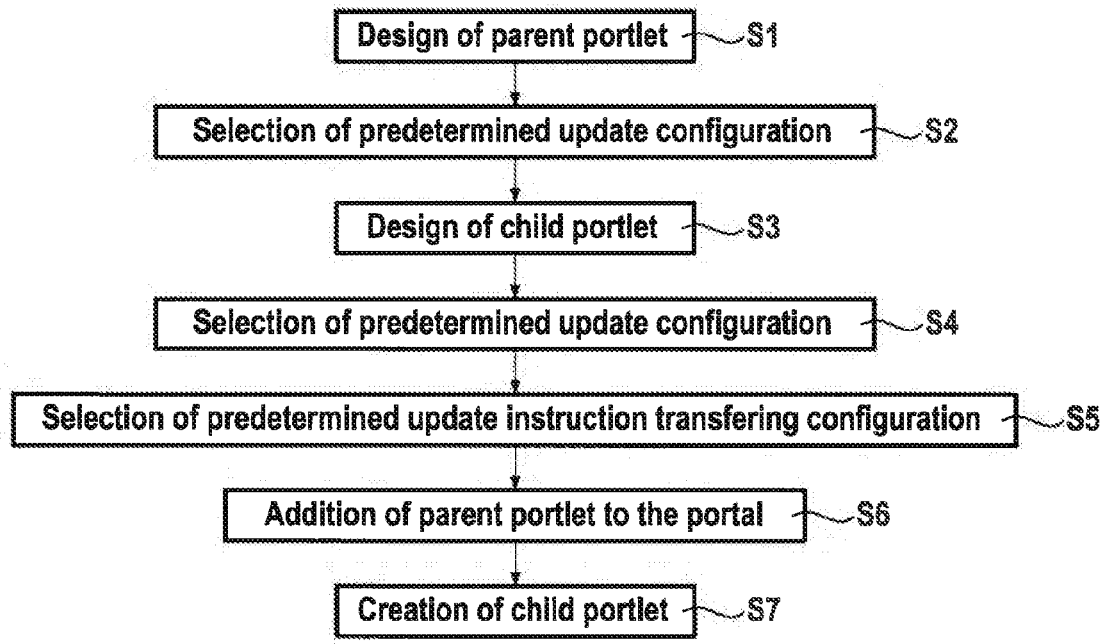
FIG. 2 is a sequence diagram showing the main features of a method to create a portlet according to a particular example of the present disclosure.

A method to create a child portlet 110 according to an example of the present disclosure will now be described with reference to FIG. 2.

In an example, a programmer designs (S1) at least one parent portlet 105 that can be added to a web portal page 100. When designing this parent portlet 105, the programmer indicates the information 117 to be displayed by the display module 140 to the memory module 115: the memory 115 may store the information 117 itself or may store an indication of a source from which the information 117 can be obtained. Then, the programmer selects (S2) one of the two predetermined update configurations 135.1, 135.2 of the processing module 135 of the parent portlet 105. Alternatively, the method may be configured so that it is the user who selects one of the two predetermined update configurations 135.1, 135.2 of the processing module 135 of the parent portlet 105 when defining the personalized layout of the web portal page 100. The parent portlet 105 is configured to employ, during operation, the particular predetermined update configuration that has been selected for it.

Furthermore, the programmer designs (S3) at least one child portlet 110 that can be a child portlet 110 of the parent portlet 105. When designing this child portlet 110, the programmer indicates the information 119 to be displayed by the display module 140 to the memory module 115: the memory 115 may store the information 119 itself or may store an indication of a source from which the information 119 can be obtained. Then, the programmer selects (S4) one of the three predetermined update configurations 135.3, 135.4, 135.5 of the processing module 135 of the child portlet 110. Alternatively, the method may be configured so that it is the user who selects one of the three predetermined update configurations 135.3, 135.4, 135.5 of the processing module 135 of the parent portlet 105 when defining the personalized layout of the web portal page 100.

Moreover, the programmer selects (S5) one of the two predetermined update instruction transferring configurations 145.1, 145.2 of the update instruction transferring module 145 of the child portlet 110. Alternatively, the method may be configured so that it is the user who selects one of the two predetermined update instruction transferring configurations 145.1, 145.2 of the update instruction transferring module 145 of the child portlet 110 when defining the personalized layout of the web portal page 100. The child portlet 110 is configured to employ, during operation, the particular predetermined update configuration and update instruction transferring configuration that have been selected for it.

Later, the user of the web portal page 100 starts to define a personalized layout of this web portal page 100 by adding (S6) the parent portlet 105 to the web portal page 100. Then, for example, if the user clicks on the parent portlet 105, the creation module 120 of this parent portlet 105 may create (S7) the child portlet 110.

Figure 3:
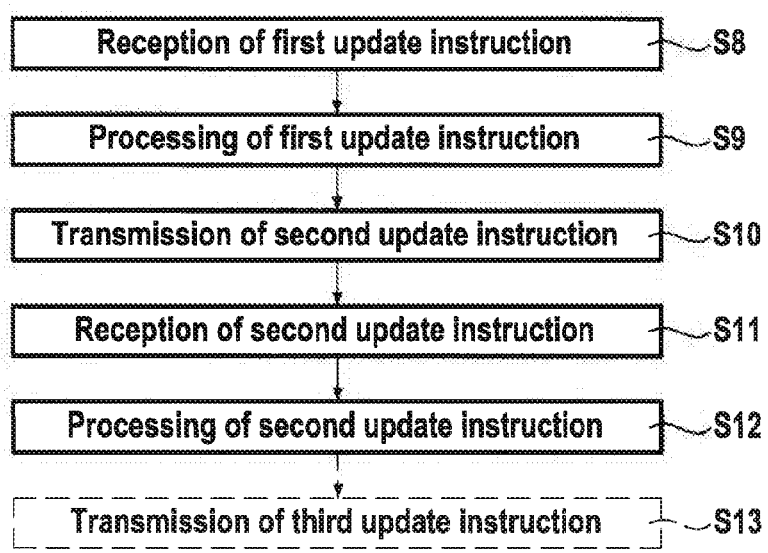
FIG. 3 is a sequence diagram showing the main features of a method to update a portal according to a particular example of the present disclosure.

A method to update a portal 100 according to an example of the present disclosure will now be described with reference to FIG. 3.

More specifically, the portal 100 comprises at least one parent portlet 105 and plural child portlets 110 of this parent portlet 105, the parent portlet 105 and the child portlets 110 of the portal 100 carrying out the method of this example to update the portal 100.

When the user opens the web portal page 100, the portal sends a portal update notification to all portlets, and each portlet is updated responsive to reception of the portal update instruction.

Then, in this example, the reception module 125 of the parent portlet 105 receives (S8) the first update instruction 160. The sending of the first update instruction 160 can be triggered by a user action, for example, a click of a mouse on the parent portlet 105. In another example, the sending of the first update instruction 160 is periodically triggered by a timer.

Then, the first update instruction 160 is processed (S9) by the parent portlet 105 according to the selected predetermined update configuration 135.1, 135.2.

More specifically, if the selected predetermined update configuration is the first predetermined update configuration 135.1, the parent portlet 105 is updated responsive to reception of the first update instruction 160. However, if the selected predetermined update configuration is the second predetermined update configuration 135.2, the parent portlet 105 is not updated.

When the parent portlet 105 is updated, the information 117 stored in the memory module 115 and displayed by the displaying module 140 is updated according to the updating information comprised in the first update instruction 160.

Then, the transmission module 130 of the parent portlet 105 transmits (S10) a second update instruction 165 to each of other parent portlets 105 and each of the child portlets 110 of this portal page 100. Indeed, in this example, a parent portlet 105 never knows its child portlets 110. Thus, the parent portlet 105 will always transmit the second update instruction 165 to all portlets. The sent second update instruction 165 is the same for each portlet 105, 110. Furthermore, the second update instruction 165 comprises the identifier 116 of the parent portlet 105 which transmits this second update instruction 165.

Each parent portlet 110 receives the second update instruction 165, but ignores this second update instruction 165. In a variant, each parent portlet 110 receives the second update instruction and processes this second update instruction 165 according to the selected predetermined update configuration.

Each child portlet 110 receives (S11) the second update instruction 165 and processes (S12) this second update instruction 165 according to the selected predetermined update configuration 135.3, 135.4, 135.5 of this child portlet 110, to accept or reject an update of this child portlet 110 according to the second update instruction 165 depending on the selected predetermined update configuration 135.3, 135.4, 135.5.

More specifically, if the selected predetermined update configuration of one of the child portlets 110 is the third predetermined update configuration 135.3, this child portlet 110 is not updated, irrespective of the identifier 116 of the parent portlet 105 comprised in the second update instruction 165.

Moreover, if the selected predetermined update configuration of one of the child portlets 110 is the fourth predetermined update configuration 135.4, this child portlet 110 is updated, irrespective of the identifier 116 of the parent portlet 105 comprised in the second update instruction 165.

Furthermore, if the selected predetermined update configuration of one of the child portlet 110 is the fifth predetermined update configuration 135.5, the child portlet 110 compares the identifier 116 of the parent portlet 105 comprised in the second update instruction 165 with the identifier 116 of the parent portlet 105 stored in the memory module 115 of this child portlet 110. If the two identifiers match, the child portlet 110 is updated.

Then, if the first predetermined update instruction transferring configuration 145.1 of a child portlet 110 is selected, the transmission module 130 of this child portlet 110 transmits (S13) the third update instruction 170 to each of the parent portlets 105 and each of the other child portlets 110 of the portal page 100. This third update instruction 170 is the same for each of the portlets 105, 110 and comprises the identifier 118 of the child portlet 110 sending the third update instruction 170. Then, each parent portlet 110 receives the third update instruction 170 but ignores this third update instruction 170. In a variant, each parent portlet 110 receives the third update instruction 170 and processes this third update instruction 170 according to the selected predetermined update configuration. Moreover, steps S11 and S12 are performed again by the other child portlets 110 and by using the third update instruction 170. Thus, if at least one other child portlet 110 is a child portlet 110 of the child portlet 110 sending the third update instruction 170, and if the selected predetermined update configuration of one of this at least one other child portlet 110 is the fifth predetermined update configuration 135.5, this at least one other child portlet 110 is updated.

When a child portlet 110 is updated, the information 119 stored in the memory module 115 and displayed by the displaying module 140 is updated according to the updating information comprised in the second update instruction 165, or the third update instruction 170, as the case may be.

Figure 4:
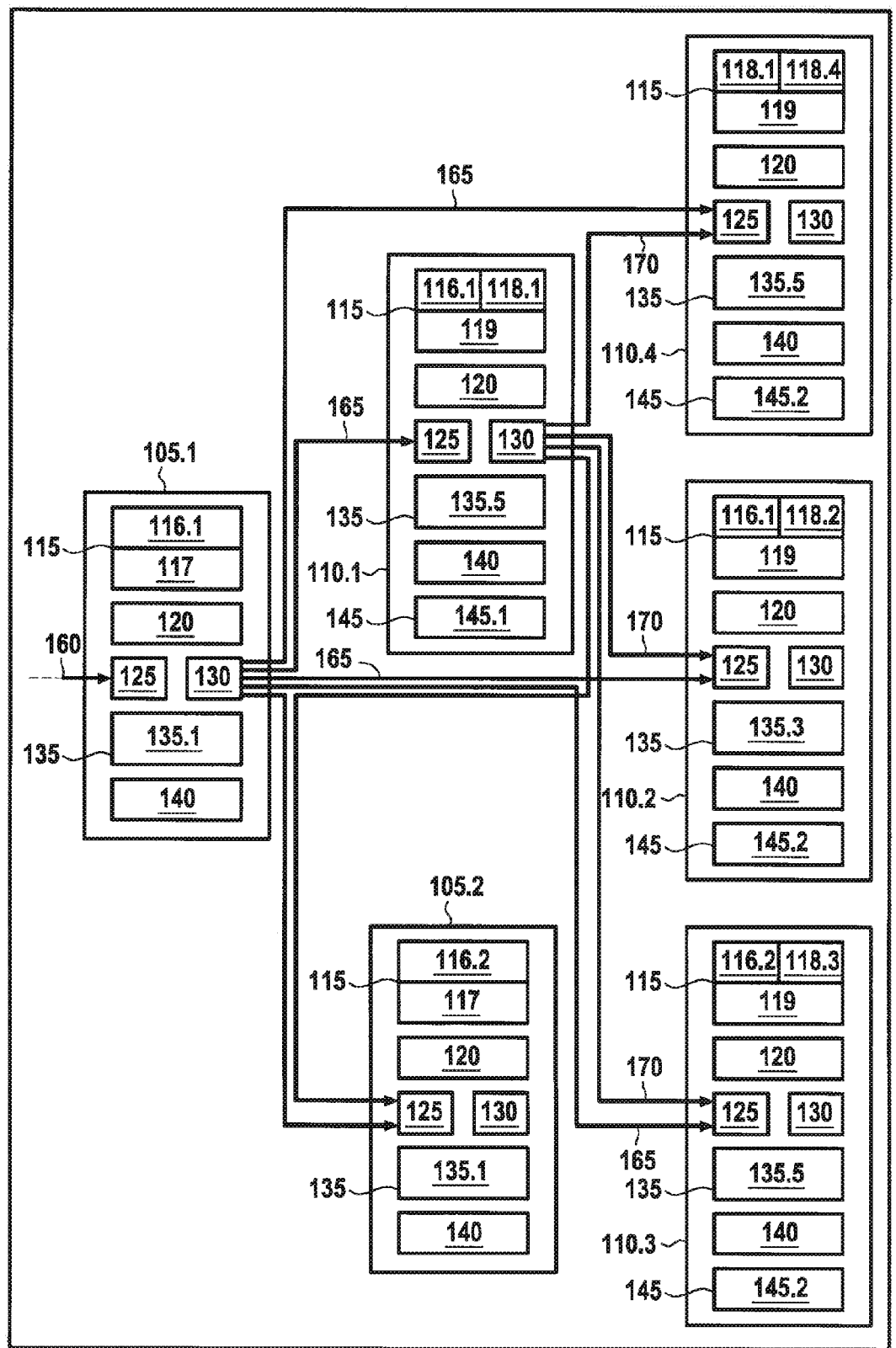
FIG. 4 represents a portal according to a particular example of the present disclosure.

FIG. 4 schematically shows a particular example of a web portal page 100 including two parent portlets 105.1, 105.2, and four child portlets 110.1, 110.2, 110.3, 110.4. The first child portlet 110.1 and the second child portlet 110.2 have been created by the first parent portlet 105.1. Thus, these two child portlets 110.1, 110.2 store an identifier 116.1 of the first parent portlet 105.1. Furthermore, the third child portlet 110.3 has been created by the second parent portlet 105.2. Therefore, this third child portlet 110.3 stores an identifier 116.2 of the second parent portlet 105.2. Moreover, the fourth child portlet 110.4 has been created by the first child portlet 110.1. Thus, this fourth child portlet 110.4 stores an identifier 118.1 of the first child portlet 110.1.

In this example, the selected predetermined update configuration of the first parent portlet 105.1 is the first update configuration 135.1, the selected predetermined update configuration of the second parent portlet 105.2 is the first update configuration 135.1, the selected predetermined update configuration of the first child portlet 110.1 is the fifth update configuration 135.5, the selected predetermined update configuration of the second child portlet 110.2 is the third update configuration 135.3, the selected predetermined update configuration of the third child portlet 110.3 is the fifth update configuration 135.5 and the selected predetermined update configuration of the fourth child portlet 110.4 is the fifth update configuration 135.5.

Moreover, the selected predetermined update instruction transferring configuration of the first child portlet 110.1 is the first predetermined update instruction transferring configuration 145.1 and the selected predetermined update instruction transferring configuration of the second child portlet 110.2, the third child portlet 110.3 and the fourth child portlet 110.4 is the second predetermined update instruction transferring configuration 145.2.

When the user opens the web portal page 100, the portal sends a portal update notification to all portlets, and each portlet is updated responsive to reception of the portal update instruction.

Then the user clicks on the first parent portlet 105, which triggers the sending of the first update instruction 160. When the first parent portlet 105.1 receives a first update instruction 160, as the selected predetermined update configuration of the first parent portlet 105.1 is the first update configuration 135.1, the first parent portlet 105.1 is updated. Then, the first parent portlet 105.1 transmits a second update instruction 165 to the second parent portlet 105.2, the first child portlet 110.1, the second child portlet 110.2, the third child portlet 110.3, and the fourth child portlet 110.4. This second update instruction 165 comprises the identifier 116.1 of the first portlet 105.1.

The second parent portlet 105.2 receives the second update instruction 165 but ignores this second update instruction 165.

Upon the reception of the second update instruction 165, as the selected predetermined update configuration of the first child portlet 110.1 is the fifth update configuration 135.5, the first child portlet 110.1 compares the identifier 116.1 comprised in the second update instruction 140 with the identifier 116.1 stored in the memory module 115 of the first child portlet 110.1. As these two identifiers are identical, the first child portlet 110.1 knows that the second update instruction comes from its parent portlet (the first parent portlet 105.1). Therefore, the first child portlet 110.1 is updated.

As the selected predetermined update configuration of the second child portlet 110.2 is the third update configuration 135.3, the second child portlet 110.2 is not updated upon the reception of the second update instruction 165.

Upon the reception of the second update instruction 165, as the selected predetermined update configuration of the third child portlet 110.3 is the fifth update configuration, the third child portlet 110.3 compares the identifier 116.1 comprised in the second update instruction 165 with the identifier 116.2 stored in the memory module 115 of the third child portlet 110.3. These two identifiers are different, because the identifier 116.1 comprised in the second update instruction 165 comes from the first parent portlet 105.1 and the identifier 116.2 stored in the third child portlet 110.3 comes from the second parent portlet 105.2. Thus, the third child portlet 110.3 knows that the second update instruction 165 does not come from its parent portlet (the second parent portlet 105.2). Therefore, the third child portlet 110.3 is not updated.

Upon the reception of the second update instruction 165, as the selected predetermined update configuration of the fourth child portlet 110.4 is the fifth update configuration, the fourth child portlet 110.4 compares the identifier 116.1 comprised in the second update instruction 165 with the identifier 118.1 stored in the memory module 115 of the fourth child portlet 110.4. These two identifiers are different, because the identifier 116.1 comprised in the second update instruction 165 comes from the first parent portlet 105.1 and the identifier 118.1 stored in the fourth child portlet 110.4 comes from the first child portlet 110.1. Thus, the fourth child portlet 110.4 knows that the second update instruction 165 does not come from its parent portlet (the first child portlet 110.1). Therefore, the fourth child portlet 110.4 is not updated.

Upon the reception of the second update instruction 165, as the selected predetermined update instruction transferring configuration of the first child portlet 110.1 is the first predetermined update instruction transferring configuration 145.1, the first child portlet 110.1 transmits a third update instruction 170 to the second child portlet 110.2, the third child portlet 110.3 and the fourth child portlet 110.4. This third update instruction comprises the identifier 118.1 of the first child portlet 110.1.

When the first parent portlet 105.1 and the second parent portlet 105.2 receives the third update instruction 170, these two portlets 105.1, 105.2 ignore this third update instruction 170.

As the selected predetermined update configuration of the second child portlet 110.2 is the third update configuration 135.3, the second child portlet 110.2 is not updated upon the reception of the third update instruction 170.

Upon the reception of the third update instruction 170, as the selected predetermined update configuration of the third child portlet 110.3 is the fifth update configuration, the third child portlet 110.3 compares the identifier 118.1 comprised in the third update instruction 170 with the identifier 116.2 stored in the memory module 115 of the third child portlet 110.3. These two identifiers are different, therefore, the third child portlet 110.3 is not updated.

Upon the reception of the third update instruction 170, as the selected predetermined update configuration of the fourth child portlet 110.4 is the fifth update configuration, the fourth child portlet 110.4 compares the identifier 118.1 comprised in the third update instruction 170 with the identifier 118.1 stored in the memory module 115 of the fourth child portlet 110.4. As these two identifiers are identical, the fourth child portlet 110.4 knows that the third update instruction 170 comes from its parent portlet (the first child portlet 110.1). Therefore, the fourth child portlet 110.4 is updated.

Figure 5:
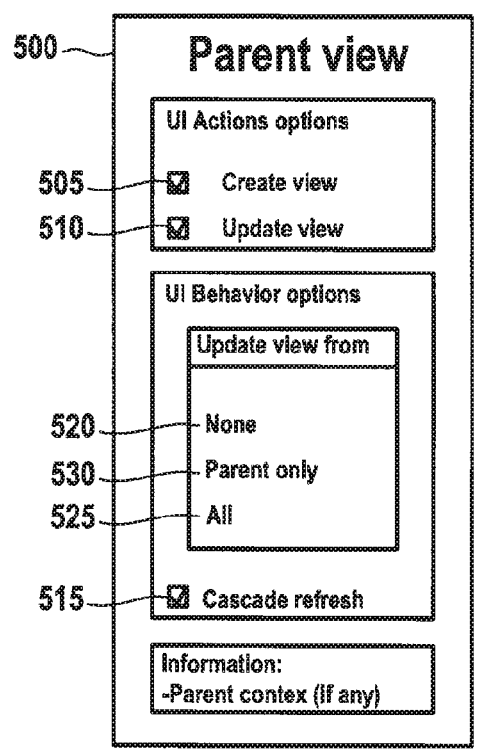
FIG. 5 represents an option/preference page of a portlet according to a particular example of the present disclosure.

This method to update a portal does not need an additional component. Parent/child relationships are not hardcoded, these relationships are defined dynamically. Thus, the programmer does not have to think about the entire web portal page when he designs a portlet. Portals according to the examples in this disclosure are also very user-friendly. The settings of a portlet are simple to explain to the user and easy to change through an option/preferences page 500. An example of such an option/preference page 500 will now be described with reference to FIG. 5. By checking a create view box 505, the user enables the creation module 120 of the portlet. By checking an update view box 510, the user enables the transmission module 130 and the processing module 135 of the portlet. Furthermore, by checking a cascade refresh box 515, the user enables the first predetermined update instruction transferring configuration. By unchecking a cascade refresh box 515, the user enables the second predetermined update instruction transferring configuration. Moreover, the user can select the third predetermined update configuration 135.3 by clicking on the none button 520, the fourth predetermined update configuration 135.4 by clicking on the all button 525 and the fifth predetermined update configuration 135.3 by clicking on the parent only button 530.

Methods according to the present disclosure can be used for others standalone components than portlets. For example, methods according to the present disclosure can be used for plug-in components.

Various modifications and extensions can be made of the methods described above. For example, although in the examples described above the parent and child portlets store in memory all the possible configurations 135 and 145, in other examples each parent portlet 105 and child portlet 110 holds in memory only the configuration that has been selected for it by the programmer or user.

The invention claimed is:

1. A method to update a portal, the portal comprising a first portlet and plural second portlets, wherein the first portlet is a parent portlet and the plural second portlets are child portlets of the parent portlet, and the method comprises:

reception by the first portlet of a first update instruction that is processed by the first portlet to update the first portlet according to a predetermined update configuration stored by the first portlet;

reception by the first portlet of a second update instruction that is processed by the first portlet to not update the first portlet according to the predetermined update configuration stored by the first portlet;

transmission by the first portlet of the second update instruction to each of the plural second portlets responsive to the first portlet being updated, the transmitted second update instruction being the same for each second portlet;

reception by the plural second portlets of the second update instruction; and for the plural second portlets, processing of the second update instruction according to a predetermined update configuration of a respective second portlet, to accept or reject an update of said second portlet, according to the second update instruction, depending on said predetermined update configuration of the respective second portlet.

2. The method according to claim 1, wherein the second update instruction comprises an identifier of the first portlet.

3. The method according to claim 2, wherein the predetermined update configuration of at least one second portlet is such that when said second portlet receives the second update instruction, said second portlet is not updated, irrespective of the identifier of the first portlet in the second update instruction.

4. The method according to claim 2, wherein the predetermined update configuration of at least one second portlet is such that when said second portlet receives the second update instruction, said second portlet is updated, irrespective of the identifier of the first portlet in the second update instruction.

5. The method according to claim 2, wherein:
at least one second portlet stores a predetermined identifier, and
the processing comprises comparison between the predetermined identifier and the identifier of the first portlet, so as to accept the second update if the predetermined identifier and the identifier of the first portlet match.

6. The method according to claim 1, wherein said method comprises:
the transmission by a second portlet of a third update instruction to each of the other plural second portlets, the sent third update instruction being the same for each of the other second portlets and comprising an identifier of said second portlet.

7. A system, comprising memory, and a portal, wherein said portal comprises a first portlet and plural second portlets, wherein said first portlet comprises:
a reception module to receive a first update notification;
a transmission module to transmit a second update instruction to each of the plural second portlets, the second update instruction being the same for each of the plural second portlets; and,
a processing module to process the second update instruction according to a predetermined update configuration of the respective second portlet so as to accept or reject an update of the second portlet according to the second update instruction depending on the predetermined update configuration.

8. The system of claim 7, wherein the first portlet is to process the second update notification to not update the first portlet according to a predetermined update configuration.

9. The system of claim 7, wherein at least one second portlet is to transmit a third update instruction to each of the plural second portlets responsive to receipt of the second update instruction.

10. The system of claim 7, wherein at least one second portlet is to not transmit a third update instruction to each of the plural second portlets responsive to receipt of the second update instruction.

11. The system of claim 7, wherein at least one second portlet is to process the second update instruction according to a predetermined update configuration of the at least one second portlet, to accept or reject an update of the at least one second portlet, according to the second update instruction, depending on the predetermined update configuration of the at least one second portlet.

12. A method, comprising:
creating a first portlet storing an identifier of a second portlet and a predetermined configuration adapting the first portlet to accept an update when the second portlet sends a first update instruction comprising the identifier of the second portlet to the first portlet; and
transmitting, by the first portlet, a second update instruction comprising an identifier of the first portlet and update information to update the second portlet;
receiving, by the second portlet, the second update instruction; and
processing the second update instruction to accept or reject an update of the second portlet.

13. The method of claim 12, further comprising transmitting, by the second portlet, the second update instruction to a third portlet.

14. The method of claim 12, further comprising updating the first portlet according to the first update instruction.

15. The method of claim 14, wherein transmitting the second update instruction to the second portlet further comprises transmitting the second update instruction to the second portlet responsive to the first portlet being updated according to the first update instruction.

16. The method of claim 12, further comprising processing the second update instruction by the second portlet to accept or reject an update of the second portlet.

17. The method of claim 12, wherein the first portlet is a parent portlet of the second portlet.

18. The method of claim 12, further comprising displaying at least one of the first portlet and the second portlet via a display module.

19. The method of claim 12, further comprising transmitting, by the first portlet, the second update instruction to a third portlet, wherein the third portlet is a parent portlet.

* * * * *